(12) United States Patent
Yamada (10) Patent No.: US 11,919,308 B2
(45) Date of Patent: Mar. 5, 2024

(54) INKJET HEAD AND PRODUCTION METHOD FOR INKJET HEAD

(71) Applicant: Konica Minolta, Inc., Tokyo (JP)

(72) Inventor: Akihisa Yamada, Hino (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 17/771,315

(22) PCT Filed: Oct. 30, 2019

(86) PCT No.: PCT/JP2019/042575
§ 371 (c)(1),
(2) Date: Apr. 22, 2022

(87) PCT Pub. No.: WO2021/084649
PCT Pub. Date: May 6, 2021

(65) Prior Publication Data
US 2022/0402269 A1    Dec. 22, 2022

(51) Int. Cl.
*B41J 2/16*    (2006.01)
*B41J 2/14*    (2006.01)

(52) U.S. Cl.
CPC .......... *B41J 2/1623* (2013.01); *B41J 2/1433* (2013.01); *B41J 2/162* (2013.01)

(58) Field of Classification Search
CPC ......... B41J 2/162; B41J 2/1623; B41J 2/1433
See application file for complete search history.

(56) References Cited

U.S. PATENT DOCUMENTS

2016/0236467 A1 * 8/2016 Takahashi .............. B41J 2/1603

FOREIGN PATENT DOCUMENTS

| EP | 2527151 | A1 * | 11/2012 | .......... B41J 2/14209 |
|---|---|---|---|---|
| JP | 2000-129238 | A | 5/2000 | |
| JP | 2007-269959 | | 10/2007 | |
| JP | 2007-269959 | A | 10/2007 | |
| JP | 2011-109005 | A | 6/2011 | |
| JP | 2011109005 | A * | 6/2011 | |
| JP | 5279117 | B2 | 9/2013 | |
| JP | 5754378 | B2 | 7/2015 | |

OTHER PUBLICATIONS

Japanese Office Action (JPOA) dated Dec. 6, 2022 issued in Japanese Patent application No. 2021-553958 and its machine English translation.

(Continued)

*Primary Examiner* — Jason S Uhlenhake
(74) *Attorney, Agent, or Firm* — RANKIN, HILL & CLARK LLP (57) ABSTRACT

In order to provide an inkjet head using an adhesive containing an epoxy resin as a main agent and an imidazole-based curing agent as a curing agent, capable of securing a time for joining work before curing, and having excellent long-term reliability, and a production method for the inkjet head, constituent members are bonded to each other by an adhesive containing at least an epoxy resin as a main agent, a microencapsulated imidazole-based curing agent as a curing agent, and an alcohol that dissolves the microcapsules at a low temperature, and preferably, a residue of the microcapsules dissolved by the alcohol is dispersed in the cured epoxy resin.

10 Claims, 2 Drawing Sheets

(56) References Cited

OTHER PUBLICATIONS

Chinese Office Action (CNOA) dated Feb. 7, 2023 for Chinese Patent Application No. 201980101917.1; English translation.
Extended European Search Report (EESR) dated Sep. 21, 2022 for European Patent Application No. 19950822.7.
International Search Report (ISR) dated Dec. 17, 2019 filed in PCT/JP2019/042575.
PCT Written Opinion of the International Searching Authority dated Dec. 17, 2019 filed in PCT/JP2019/042575; English translation.

* cited by examiner

INKJET HEAD AND PRODUCTION METHOD FOR INKJET HEAD

TECHNICAL FIELD

The present invention relates to an inkjet head and a production method for the inkjet head, and more specifically relates to an inkjet head using an adhesive containing an epoxy resin as a main agent and an imidazole-based curing agent as a curing agent, capable of securing a time for joining work before curing, and having excellent long-term reliability (temperature fluctuation resistance in use environment), and a production method for the inkjet head.

BACKGROUND ART

An inkjet head that ejects ink in a form of fine droplets has been widely used as a recording head of an inkjet printer that ejects ink droplets onto a recording medium to record characters and images.

Examples of a typical ink ejection method of the inkjet head include a method for applying a voltage by disposing a piezoelectric body in a pressurizing chamber or by using a part of constituent members of the pressurizing chamber as a piezoelectric body, and deforming the piezoelectric body to apply pressure to the ink, thus ejecting the ink, and a method for disposing an electric resistor in a pressurizing chamber, supplying a current thereto, and generating heat to vaporize and expand moisture in ink to apply pressure to the ink, thus ejecting the ink.

In recent years, in an inkjet head, an interval between adjacent nozzles has become extremely narrow in order to increase the density of a recorded image. For example, when image recording is performed at 180 dpi (here, "dpi" refers to the number of dots per inch), an interval between adjacent nozzles is 140 μm. In this case, assuming that the thickness of a pressure chamber partition is 70 μm, the width of the pressure chamber is 70 μm.

The inkjet head is constituted by joining constituting members such as a nozzle plate and a pressure chamber partition to each other by a thermosetting adhesive. By using the adhesive, the density can be increased, and the degree of freedom in material selection of the constituent members is also increased. The adhesive used in the inkjet head needs to have high durability against ink (solvent) after being cured. As an adhesive that increases a crosslinking density to have high solvent resistance by being cured, an adhesive containing an epoxy resin and a chain polymerization type curing agent (imidazole) is known.

Patent Literature 1 describes an inkjet head constituted using an adhesive containing a novolac or a bisphenol F epoxy resin, an alicyclic amine, and an alcohol. This adhesive can be cured at a low temperature, and has high solvent resistance of an adhesive force.

Patent Literature 2 describes an inkjet head constituted using an adhesive containing a novolac epoxy resin, a photocuring agent, and a microencapsulated curing agent. This adhesive makes it possible to achieve both productivity due to photocurability and solvent resistance of an adhesive force.

CITATION LIST

Patent Literature

Patent Literature 1: JP 5279117 B2
Patent Literature 2: JP 5754378 B2

SUMMARY OF INVENTION

Technical Problem

By the way, in an adhesive containing an epoxy resin as a main agent and an imidazole-based curing agent as a curing agent, when the main agent and the curing agent are mixed, a reaction starts even at normal temperature, and thickening and curing start. In such an adhesive having high reactivity, since a polymerization reaction proceeds at room temperature and viscosity increases, it is not possible to secure a time for joining work using the adhesive.

In addition, the adhesive containing an epoxy resin and an imidazole-based curing agent is cured by chain polymerization to increase a crosslinking density, and has high solvent resistance and elastic modulus after being cured. However, in an inkjet head in which members made of materials that are hard and brittle and have different linear expansion coefficients are joined to each other, thermal stress is applied, and long-term reliability (temperature fluctuation resistance in use environment) is poor.

When the imidazole-based curing agent is microencapsulated, a thickening rate (viscosity increasing rate) can be suppressed, a time for joining work can be secured, and a throughput of assembly of the inkjet head can be increased. However, a temperature of 100° C. or higher is required to dissolve or break (hereinafter, simply referred to as "dissolve") the microcapsules, low temperature curing cannot be performed, and a curing temperature increases. As the curing temperature increases, damage to the constituent members and thermal stress in the inkjet head during assembly increase, and therefore long-term reliability is impaired. In an inkjet head constituted by joining members made of many types of materials to each other, the members are deformed after an adhesive is cured due to a difference in linear expansion coefficient between the members, and when stress due to the deformation exceeds an adhesive force, peeling occurs in a joint.

Some designs of microcapsules increase the solubility in the epoxy resin above a certain temperature to make curing at the temperature possible. However, curing at a lower temperature is required for joining different types of materials constituting the inkjet head.

Therefore, an object of the present invention is to provide an inkjet head using an adhesive containing an epoxy resin as a main agent and an imidazole-based curing agent as a curing agent, capable of securing a time for joining work before curing, and having excellent long-term reliability, and a production method for the inkjet head.

Furthermore, other objects of the present invention will become apparent from the following description.

Solution to Problem

The above problems of the present invention are solved by the following inventions.

1.

An inkjet head including constituent members bonded to each other by an adhesive containing at least an epoxy resin as a main agent, a microencapsulated imidazole-based curing agent as a curing agent, and an alcohol that dissolves the microcapsules at a low temperature.

2.

The inkjet head according to the above item 1, in which a residue of the microcapsules dissolved by the alcohol is dispersed in the cured epoxy resin.

3.

The inkjet head according to the above item 1 or 2, in which the alcohol is a high-boiling-point alcohol.

4.

The inkjet head according to the above item 3, in which the high-boiling-point alcohol has a boiling point of 150° C. or higher.

5.

The inkjet head according to any one of the above items 1 to 4, in which the alcohol has a benzene ring.

6.

A production method for an inkjet head, the method including bonding constituent members to each other using an adhesive containing at least an epoxy resin as a main agent, a microencapsulated imidazole-based curing agent as a curing agent, and an alcohol that dissolves the microcapsules at a low temperature.

7.

The production method for an inkjet head according to the above item 6, in which a residue of the microcapsules dissolved by the alcohol is dispersed in the epoxy resin to cure the epoxy resin.

8.

The production method for an inkjet head according to the above item 6 or 7, in which a high-boiling-point alcohol is used as the alcohol.

9.

The production method for an inkjet head according to the above item 8, in which the high-boiling-point alcohol has a boiling point of 150° C. or higher.

10.

The production method for an inkjet head according to any one of the above items 6 to 9, in which an alcohol having a benzene ring is used as the alcohol.

Advantageous Effects of Invention

The present invention can provide an inkjet head using an adhesive containing an epoxy resin as a main agent and an imidazole-based curing agent as a curing agent, capable of securing a time for joining work before curing, and having excellent long-term reliability, and a production method for the inkjet head.

DESCRIPTION OF EMBODIMENTS

Hereinafter, an embodiment for performing the present invention will be described with reference to the drawings. Various technically preferable limitations in order to perform the present invention are given to the embodiments described below, but the scope of the present invention is not limited to the following embodiments and illustrated examples.

In an inkjet head and a production method for the inkjet head of the present embodiment, constituent members are bonded to each other by an adhesive containing at least an epoxy resin as a main agent, a microencapsulated imidazole-based curing agent as a curing agent, and an alcohol that dissolves the microcapsules at a low temperature. Examples of the constituent member of the inkjet head include, but are not limited to, a head chip, a nozzle plate, a wiring substrate, a flexible substrate, a manifold, a filter, a housing, and a cap receiving plate.

The alcohol is well mixed with the epoxy resin, assists dissolution of the microcapsules enclosing the imidazole-based curing agent, and can start a curing reaction at a low temperature. In addition, a thickening rate can be suppressed, a time for joining work can be secured, and a throughput of assembly can be increased.

[Inkjet Head]

Figure 1:
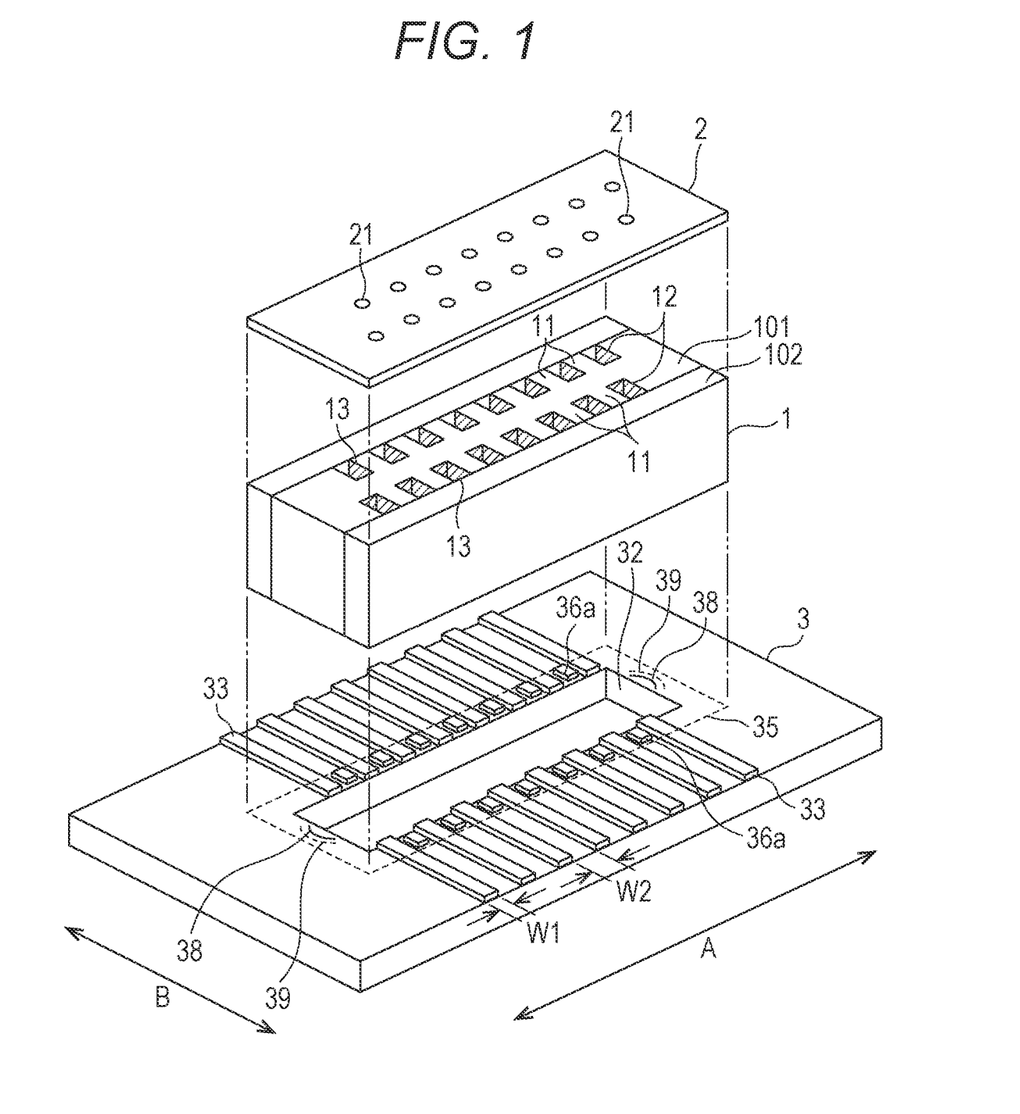
FIG. 1 is a perspective view of a head chip of an inkjet head according to an embodiment.

FIG. 1 is a perspective view of a head chip of the inkjet head according to the embodiment.

In the present embodiment, a surface (upper side in FIG. 1) on a side on which ink is ejected from the inkjet head is referred to as a "lower surface", and a surface (lower side in FIG. 1) on the opposite side thereto is referred to as an "upper surface". In FIG. 1, an ink flow direction is from bottom to top.

As illustrated in FIG. 1, the inkjet head according to the embodiment includes a rectangular parallelepiped head chip 1 in which a plurality of pressure chambers 12 is formed. The head chip 1 includes, for example, a channel member (partition wall) 11 made of a piezoelectric body and a pressure chamber (ink supply path) 12 alternately juxtaposed. The pressure chamber 12 is formed such that both side walls thereof are parallel to each other. An outlet and an inlet of each pressure chamber 12 are formed on a lower surface and an upper surface of the head chip 1, respectively, and each pressure chamber 12 is a straight type in which an opening area and an opening shape are substantially unchanged in a length direction from the inlet to the outlet.

In the head chip 1, the pressure chambers 12 constitute two rows of pressure chambers. Each pressure chamber row includes eight pressure chambers 12 in the present embodiment, but the number of pressure chambers 12 constituting the pressure chamber row is not limited at all. The shapes and arrangement of the pressure chambers 12 are not limited at all, and a dummy channel may be included.

The head chip 1 is formed by joining a piezoelectric body 101 having a plurality of grooves to be the pressure chambers 12 and a side wall plate 102 closing the plurality of grooves to each other using an adhesive. On an inner surface of the groove of the piezoelectric body 101 (an inner surface of the pressure chamber 12), a drive electrode constituted by a metal layer 13 indicated by hatching in FIG. 1 is formed. The metal layer 13 is preferably covered with a transparent insulating layer in order to prevent corrosion due to ink.

The metal layer 13 acts as a drive electrode of the channel member 11, and is made of, for example, Ni, Co, Cu, Al, Sn, or Cr. It is preferable to use Al or Cu from a viewpoint of electric resistance, and it is preferable to use Ni from a viewpoint of corrosion, strength, and cost. A stacked structure in which Au is stacked on Al may be adopted. The metal layer 13 is formed, for example, by a method using a vacuum device, such as a vapor deposition method, a sputtering method, a plating method, or a chemical vapor deposition (CVD) method. The metal layer 13 preferably has a thickness in a range of 0.5 to 5 μm.

Figure 2:
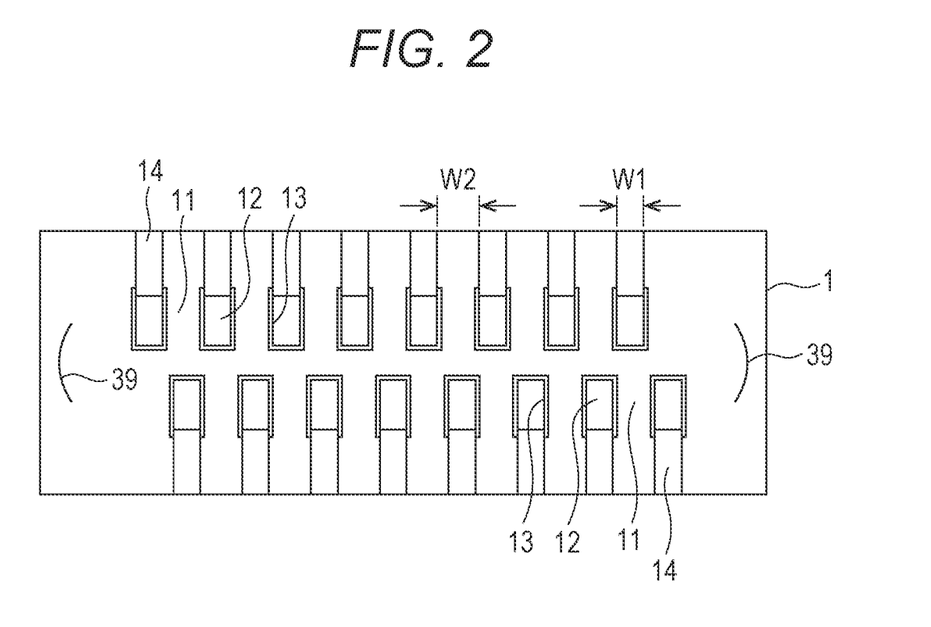
FIG. 2 is a plan view illustrating an upper surface of the head chip illustrated in FIG. 1.

FIG. 2 is a plan view illustrating an upper surface of the head chip illustrated in FIG. 1.

As illustrated in FIG. 2, a connection electrode 14 (voltage application electrode) drawn out from the metal layer 13 of each pressure chamber 12 is formed on the upper surface of the head chip 1. The connection electrode 14 can be formed by vapor deposition or sputtering.

As illustrated in FIG. 1, a nozzle plate 2 is joined to a lower surface of the head chip 1 using an adhesive. In the nozzle plate 2, nozzles 21 are opened at positions corresponding to the outlets of the pressure chambers 12 of the head chip 1, respectively. The inlet and the outlet of each pressure chamber 12, and the nozzle 21 are linearly arranged.

The nozzle plate 2 is preferably made of a material that can be ablated by laser light or a material that can be anisotropically etched. For example, a resin sheet such as polyimide, polyethylene terephthalate, polyamide, or polysulfone, or silicon can be preferably used. In particular, it is preferable to use polyimide which can withstand a high temperature for applying an ink repellent layer to a surface and on which precise nozzle processing with laser light can be performed.

A wiring substrate 3 is joined to the upper surface of the head chip 1 on which the connection electrode 14 is formed using an adhesive. The wiring substrate 3 is a plate-shaped member for connecting wiring that applies a drive voltage from a drive circuit (not illustrated) to each metal layer 13 of the head chip 1. The wiring substrate 3 is made of a ceramic material such as non-polarized PZT, AlN-BN, or AlN, plastic or glass having low thermal expansion, a material obtained by depolarizing the same material as a substrate material of the piezoelectric body used in the head chip 1, or the like. The material of the wiring substrate 3 is preferably a material having a difference in thermal expansion coefficient within ±3 ppm with respect to unpolarized PZT in order to suppress distortion of the head chip 1 caused by a difference in linear expansion coefficient.

The wiring substrate 3 is not limited to one plate-shaped wiring substrate, and may be a wiring substrate obtained by stacking a plurality of thin plate-shaped substrate materials to have a desired thickness.

The wiring substrate 3 is formed in a rectangular shape larger than the upper surface of the head chip 1, and protrudes outward from the upper surface of the head chip 1 on both sides of a pressure chamber row direction (arrangement direction of pressure chambers 12, direction A in FIG. 1) and a direction orthogonal to the pressure chamber row direction (direction B in FIG. 1).

A plurality of wiring electrodes (voltage application electrodes) 33 for connecting each metal layer 13 to an FPC (not illustrated) or the like is formed on a lower surface of the wiring substrate 3, which is a joining surface to the head chip 1, over a portion protruding outward. The same number of wiring electrodes 33 as the connection electrodes 14 formed on the upper surface of the head chip 1 are formed at the same pitch (W1+W2). When being connected to the FPC or the like, each wiring electrode 33 is electrically connected to each wire of the FPC or the like. Each wiring electrode 33 connected to each wire of the FPC or the like functions as an electrode for applying a drive voltage from a drive circuit (not illustrated) to the metal layer 13 in the pressure chamber 12 via the connection electrode 14.

An opening 32 penetrating the wiring substrate 3 from a lower surface of the wiring substrate 3 to an upper surface thereof is formed in a substantially central portion of the wiring substrate 3. The opening 32 has a size that allows inlet-side openings of all the pressure chambers 12 facing the upper surface of the head chip 1 to be exposed to the upper surface side, Each wiring electrode 33 is formed from a peripheral edge of the opening 32 to an outer edge of the wiring substrate 3.

A dummy electrode 36a that is positioned between the wiring electrodes 33 and is not involved in driving is formed on the lower surface of the wiring substrate 3. The dummy electrode 36a is formed such that a portion between the head chip 1 and the wiring substrate 3 is sealed with the adhesive. A positioning pattern 38 for positioning the head chip 1 is formed on the lower surface of the wiring substrate 3. When the head chip 1 and the wiring substrate 3 are joined to each other, the positioning pattern 38 is fitted to a positioning pattern 39 (see FIG. 2) formed on the upper surface of the head chip 1 to position the head chip 1 and the wiring substrate 3.

In order to join the head chip 1 and the wiring substrate 3 to each other, first, the adhesive is applied to bonding surfaces of the head chip 1 and the wiring substrate 3 (an upper surface of the head chip 1 and a lower surface of the wiring substrate 3). Next, each connection electrode 14 of the head chip 1 and each wiring electrodes 33 of the wiring substrate 3 are aligned so as to be electrically connected to each other and superimposed. Then, by heating and pressurizing the head chip 1 and the wiring substrate 3 at a predetermined temperature for a predetermined time to cure the adhesive, the head chip 1 and the wiring substrate 3 are joined to each other.

The head chip 1 and the nozzle plate 2 are also joined to each other by applying the adhesive to the bonding surfaces of the head chip 1 and the nozzle plate 2 (a lower surface of the head chip 1 and an upper surface of the nozzle plate 2), aligning and superimposing the head chip 1 and the nozzle plate 2, and heating and pressurizing the head chip 1 and the nozzle plate 2 at a predetermined temperature for a predetermined time to cure the adhesive.

The amount of the adhesive applied to a member surface is not particularly limited, but a wet film thickness when the adhesive is applied is preferably 0.5 μm or more and 1000 μm or less. The wet film thickness when the adhesive is applied is preferably 1.0 μm or more and 25.0 μm or less. When the wet film thickness is 0.5 μm or more, durability of joining between the members can be improved. When the wet film thickness is 1000 μm or less, the amount of the adhesive is not excessive, and overflow of the adhesive and the like can be prevented.

A constituent member such as a manifold other than the above-described members of the inkjet head is also joined to other members using the adhesive to constitute the inkjet head. The adhesion of the constituent members of the inkjet head includes, in addition to the above-described adhesion between the upper surface of the head chip 1 and the lower surface, of the wiring substrate 3 and the above-described adhesion between the lower surface of the head chip 1 and the upper surface of the nozzle plate 2, adhesion between a lower end of a flexible substrate and the lower surface of the wiring substrate 3, adhesion between the wiring substrate 3 and a manifold (not illustrated), adhesion between the manifold and a filter (not illustrated), adhesion between a housing (not illustrated) and a cap receiving plate (not illustrated), and the like.

[Adhesive]

The adhesive used in the present embodiment contains at least an epoxy resin as a main agent, a microencapsulated imidazole-based curing agent as a curing agent, and an alcohol that dissolves the microcapsules at a low temperature. By containing an epoxy resin and an imidazole-based curing agent which is a chain polymerization type curing agent, this adhesive can secure durability of a high adhesive force against ink, chemical resistance, that is, organic solvent durability (curability). High durability against ink is a preferable characteristic as an inkjet head.

In addition, in this adhesive, since the imidazole-based curing agent is microencapsulated, the epoxy resin is not cured unless the microcapsules are dissolved, and therefore a time for joining work can be secured before the epoxy resin is cured. It is a preferable characteristic as an inkjet head constituted by positioning and bonding a large number of members to spend a time in joining work before the epoxy resin is cured.

Furthermore, since this adhesive contains an alcohol that dissolves microcapsules at a low temperature, curing at a high temperature such as 100° C. or higher can be unnecessary in order to dissolve the microcapsules, and for example, low temperature curing at a temperature lower than 100° C., can be performed. By performing such low temperature curing, thermal stress in the inkjet head during assembly does not increase, and the constituent members are not damaged by high temperature. Therefore, long-term reliability can be secured.

In this inkjet head, even if members made of many types of materials are joined to each other, the members are not deformed after the adhesive is cured due to a difference in linear expansion coefficient between the members, and therefore heat cycle resistance is high, and peeling does not occur in a joint.

[Epoxy resin]

As an epoxy resin applicable to the adhesive in the present embodiment, either a monomer of a compound having an epoxy group or an oligomer thereof can be used. Specific examples thereof include a conventionally known aromatic epoxy resin, alicyclic epoxy resin, and aliphatic epoxy resin. Note that the epoxy resin means a monomer or an oligomer thereof. In the present embodiment, the epoxy resin preferably contains an aromatic epoxy resin in an amount of 70 to 99% by mass in the epoxy resin from a viewpoint of durability against ink. As the epoxy resin used in the adhesive of the present embodiment, one type of epoxy resin may be used, or many types thereof may be used in mixture.

[Aromatic Epoxy Resin]

The aromatic epoxy resin is preferably a diglycidyl ether or polyglycidyl ether produced by a reaction between a polyhydric phenol having at least one aromatic nucleus or an alkylene oxide adduct thereof and epichlorohydrin. The aromatic epoxy resin contains a novolac type epoxy resin, and can further contain, for example, at least one of diglycidyl ether or polyglycidyl ether of bisphenol A or a polyalkylene oxide adduct thereof, a diglycidyl ether or polyglycidyl ether of hydrogenated bisphenol A or a polyalkylene oxide adduct thereof, and an epoxy resin derived from a bisphenol F type epoxy resin, a novolac, or a bisphenol. Specific examples of the bisphenol include a bisphenol A type epoxy resin and a bisphenol F type epoxy resin. Here, examples of the polyalkylene oxide include polyethylene oxide and polypropylene oxide. Among these compounds, a bisphenol F type epoxy resin is preferably contained as a main agent.

[Novolac Type Epoxy Resin]

Specific examples of the novolac type epoxy include a phenol novolac type epoxy resin and a cresol novolac type epoxy resin. The novolac type epoxy resin is a compound having a plurality of glycidyl groups in one molecule generated by a reaction between a hydroxy group of a novolac resin and epichlorohydrin. The number of epoxy groups in one molecule has a distribution, and an average value thereof varies depending on a synthesis condition, but the average number of epoxy groups in one molecule is preferably 3 or more.

Examples of a commercially available product of the novolac type epoxy resin include jER 152 (phenol novolac epoxy resin, manufactured by Japan Epoxy Resin Co., Ltd.), jER 154 (phenol novolac epoxy resin, manufactured by Japan Epoxy Resin Co., Ltd.), and EPICLON N-660 (cresol novolac epoxy resin, manufactured by DIC Corporation).

[Polyfunctional Epoxy Resin]

A polyfunctional epoxy resin is a tri- or higher functional epoxy resin excluding novolac epoxy. Specific examples of the polyfunctional epoxy resin include triglycidyl-p-aminophenol (92.3) (referred to as TGAP), tetraglycidyl diaminodiphenylmethane (105.5), triglycidyl isocyanurate (99), triglycidyl urazole (89.7), triglycidyl aminocresol (97), and tetraglycidyl-1,3-diaminomethylcyclohexane (91.5). Among these compounds, TGAP is preferably used.

[Alicyclic Epoxy Resin]

When an epoxy resin containing a novolac type epoxy resin further contains an alicyclic epoxy resin, high photosensitivity can be obtained. Examples of the alicyclic epoxy resin include a cyclohexene oxide- or cyclopentene oxide-containing compound obtained by epoxidizing a compound having at least one cyclohexene or cycloalkane ring such as a cyclopentene ring with an appropriate oxidizing agent such as hydrogen peroxide or peracid. Specific examples of the alicyclic epoxy resin include (3,4-epoxycyclohexyl) methyl-3',4'-epoxycyclohexylcarboxylate and bis-(2,3-epoxycyclopentyl) ether.

[Curing Agent]

As the curing agent in the present embodiment, an imidazole-based curing agent that is a thermal anionic polymerization initiator for polyaddition or thermal polymerization of an epoxy monomer is used.

Specific examples of the imidazole-based curing agent include 1-methylimidazole, 1-benzyl-2-methylimidazole, 1,2-dimethylimidazole, 1-isobutyl-2-methylimidazole, 1-methyl-2-ethylimidazole, 1-ethylimidazole, 1-cyanoethyl-2-ethyl-4-methylimidazole, 1-cyanoethyl-2-methylimidazole, 1-(2-hydroxy-3-phenoxypropyl)-2-ethyl-4-methylimidazole, 1-(2-hydroxy-3-phenoxypropyl)-2-methylimidazole, 2-methylimidazole, and 2-ethyl-4-methylimidazole.

[Microcapsule]

The curing agent is microencapsulated and added to the adhesive. As microcapsules of an imidazole-based curing agent, for example, HXA-3932 (obtained by microencapsulating an imidazole-based thermal polymerization initiator with MMA, and having an average particle size of 2 μm, manufactured by Asahi Kasei Chemicals Corporation), HX-3741 (obtained by microencapsulating an imidazole-based thermal polymerization initiator with MMA, and having an average particle size of 5 μm, manufactured by Asahi Kasei Chemicals Corporation), HX-3722 (obtained by microencapsulating an imidazole-based thermal polymerization initiator with MMA, and having an average particle size of 2 μm, manufactured by Asahi Kasei Chemicals Corporation), and the like are commercially available.

These microcapsules of an imidazole-based curing agent are added in an amount of preferably 1 to 100 parts by mass, more preferably 10 to 80 parts by mass with respect to 100 parts by mass of the epoxy resin.

The microcapsules are dissolved when the epoxy resin is cured. However, preferably, the microcapsules are not completely dissolved, and some of the microcapsules are dissolved to leave a residue (shell). The residue after the microcapsules are dissolved is diffused in the epoxy resin, and serves as a soft segment to improve heat cycle resistance after the epoxy resin is cured. Note that presence or absence and a diffusion state of the residue of the microcapsules in the epoxy resin can be confirmed with an electron microscope. Presence or absence and a diffusion state of the residue of the microcapsules in the epoxy resin can also be confirmed by organic substance mapping analysis by FT-IR (by performing mapping analysis on an organic substance in a minute region, the organic substance can be identified, and a present region can be specified), imaging by TOF-SIMS (time-of-flight secondary ion mass spectrometry) (mass imaging analysis can be performed on samples having various sizes from μm to cm order), and the like.

Note that, as described in, for example, JP H09-3164 ([0005] and [0006]), there are various types of microcapsules and production methods for the microcapsules. However, in the present invention, shell microcapsules using an epoxy resin and isocyanate are preferable from a viewpoint of dispersing the microcapsules in an epoxy resin as a main agent. The isocyanate to be a precursor of the microcapsules only needs to be, for example, a compound having two or more isocyanate groups in a molecule thereof as a polyvalent isocyanate, and specific examples thereof include a diisocyanate such as m-phenylene diisocyanate, p-phenylene diisocyanate, 2,4-tolylene diisocyanate, 2,6-tolylene diisocyanate, naphthalene-1,4-diisocyanate, diphenylmethane-4,4-diisocyanate, 3,3-dimethoxy-4,4-biphenyl diisocyanate, 3,3-dimethyldiphenylmethane-4,4-diisocyanate, xylylene-1,4-diisocyanate, 4,4-diphenylpropane diisocyanate, trimethylenediisocyanate, hexamethylene diisocyanate, propylene-1,2-diisocyanate, butylene-1,2-diisocyanate, cyclohexylene-1,2-diisocyanate, or cyclohexylene-1,4-diisocyanate, a triisocyanate such as p-phenylene diisothiocyanate, xylylene-1,4-diisothiocyanate, or ethylidine diisothiocyanate, a tetraisocyanate such as 4,4-dimethyldiphenylmethane-2,2,5,5-tetraisocyanate, and an isocyanate prepolymer such as a trimer of an aliphatic polyvalent isocyanate such as an adduct of hexamethylene diisocyanate and hexanetriol, an adduct of 2,4-tolylene diisocyanate and plentz catechol, an adduct of tolylene diisocyanate and hexanetriol, an adduct of tolylene diisocyanate and trimethylolpropane, an adduct of xylylene diisocyanate and trimethylolpropane, an adduct of hexamethylene diisocyanate and trimethylolpropane, triphenyldimethylene triisocyanate, tetraphenyltrimethylene tetraisocyanate, pentaphenyltetramethylene pentaisocyanate, lysine isocyanate, or hexamethylene diisocyanate. These compounds can be used singly or in combination of two or more types thereof.

Among the polyvalent isocyanates, it is preferable to use an isocyanate prepolymer represented by a polymethylene polyphenyl isocyanate such as an adduct of tolylene di isocyanate and trimethylolpropane, an adduct of xylylene diisocyanate and trimethylolpropane, or triphenyldimethylene triisocyanate from a viewpoint of film formability and mechanical strength when microcapsules are prepared.

[Silane Coupling Agent]

The adhesive may contain a silane coupling agent in order to improve durability of an adhesive force.

Preferable examples of the silane coupling agent include β-(3,4-epoxycyclohexyl) ethyltrimethoxysilane, γ-glycidoxypropyltrimethoxysilane, γ-glycidoxypropylmethyldimethoxysilane, and γ-glycidoxypropylmethyldiethoxysilane.

The addition amount of the silane coupling agent is preferably 0.5 to 5 parts by mass with respect to 100 parts by mass of the epoxy resin. When the addition amount is 0.5 parts by mass or more, durability of an adhesive force is excellent, and when the addition amount is 5 parts by mass or less, a viscosity increase during storage at room temperature is small, and a pot life can be extended.

[Alcohol]

Specific examples of the alcohol include 4-methoxybenzyl alcohol (boiling point: 259° C.), 2-phenylethanol (boiling point: 219° C.), nonyl alcohol (boiling point: 214° C.), benzyl alcohol (boiling point: 205° C.), octyl alcohol (boiling point: 194° C.), and hexanol (boiling point: 157° C.) as high-boiling-point alcohols, and pentanol (boiling point: 137° C.) and isopropanol (boiling point: 82.4° C.) as low-boiling-point alcohols. Particularly, benzyl alcohol is preferable.

Specific examples of the alcohol include further include 4-methylbenzyl alcohol, 2-phenylethanol, 3,4-dimethoxybenzyl alcohol, 4-methoxybenzyl alcohol, nonyl alcohol, and piperonyl alcohol.

The content of the alcohol is preferably 0.1 parts by mass or more and 10 parts by mass or less with respect to 100 parts by mass of the epoxy resin as a main agent This is because when the content is less than 0.1 parts by mass, solvent resistance is poor, and when the content exceeds 10 parts by mass, the solvent resistance is poor or heat cycle resistance is poor.

By containing the alcohol, the microcapsules are dissolved at a low temperature (for example, 100° C. or lower), and therefore the epoxy resin can be cured at a low temperature. In addition, the alcohol acts as a medium for uniformly dispersing a residue of the microcapsules after the microcapsules are dissolved, and the residue of the microcapsules can be used as a soft segment.

The epoxy resin cured with the imidazole-based curing agent has good solvent resistance, but is hard and brittle. The residue of the microcapsules serving as a soft segment is uniformly dispersed in the epoxy resin, toughness is thereby imparted to the entire epoxy resin, and the hard brittles properly is relaxed. As a result, the epoxy resin is cured at a low temperature in a short time, acquires a strong property against thermal stress while maintaining good solvent resistance, and can largely improve long-term reliability of the inkjet head. Note that the long-term reliability is temperature fluctuation resistance in a use environment, and can be confirmed by assembling composite materials having different linear expansions and performing a heat cycle (reliability) test.

The alcohol is preferably a high-boiling-point alcohol. The high-boiling-point alcohol preferably has a boiling point of 150° C. or higher. By interposing the high-boiling-point alcohol in the polymer structure, the cured epoxy resin is softened, stress of a bonding portion between the members is relaxed, and heat cycle resistance and stability of ink ejection can be further improved.

When the alcohol is a high-boiling-point alcohol having, for example, a boiling point of 150° C. or higher, volatilization thereof at a curing temperature of the epoxy resin can be prevented. As a result, since the alcohol remains until the epoxy resin is completely cured, the microcapsules can be dissolved favorably. Furthermore, the residue of the microcapsules can be more uniformly dispersed by the alcohol remaining until the epoxy resin is completely cured.

The alcohol also preferably has a benzene ring. An alcohol having a benzene ring can more preferably prevent volatilization thereof at a curing temperature of the epoxy resin, remains until the epoxy resin is completely cured, and therefore can favorably dissolve microcapsules made of, for example, urethane. Furthermore, the residue of the microcapsules can be more uniformly dispersed by the alcohol remaining until the epoxy resin is completely cured.

In addition, the alcohol having a benzene ring has a chemical structure similar to that of an epoxy resin (for example, a bisphenol type epoxy), therefore has favorable compatibility with the epoxy resin, does not adversely affect physical properties of the epoxy resin, and is interposed well in the polymer structure of the epoxy resin.

[Ink]

An ink applicable when an image is formed using an inkjet printer including the inkjet head of the present embodiment is not particularly limited, and examples thereof include an aqueous ink, a non-aqueous ink, a wax ink, and an active curable ink. As such an ink, a dye ink in which a coloring material is a dye, a pigment ink in which a coloring material is insoluble in a solvent constituting the ink and forms a dispersion system containing fine pigment particles, a dispersion ink formed of a dispersion of a polymer in which a coloring material is colored, or the like is used.

Among these inks, it is preferable to apply an ink containing an organic solvent in an amount of 50% or more and 100% or less with respect to the total amount of solvents, and containing an organic solvent having a high solubility in a resin component and having a solubility parameter (SP value) of 16.0 or more and 21.0 or less with respect to the resin component in an amount of 30% by mass or more and 100% or less with respect to the total amount of organic solvents to image formation from a viewpoint of being able to sufficiently exhibit the excellent characteristics of the inkjet head of the present embodiment.

The ink includes a coloring material such as a dye or a pigment, an organic solvent (solvent) that dissolves the coloring material, and the like, and the types thereof are not particularly limited.

(Organic Solvent)

For the ink, it is preferable to use an organic solvent having a high solubility in a resin, but even if an organic solvent having a high resin solubility is used, it is necessary to maintain the strength as the inkjet head. The inkjet printer is preferably suitable for an ink containing an organic solvent in an amount of 50% or more and 100% or less with respect to the total amount of solvents.

Specific examples of the organic solvent include N,N-dimethylformamide (SP value=12.1, dipole efficiency=3.86), N-methyl-2 pyrrolidinone (SP value=11.3, dipole efficiency=4.09), ethyl lactate (SP value=10.0, dipole efficiency=2.14), cyclohexanone (SP value=9.9, dipole efficiency=3.01), and 2-pyrrolidinone, (SP value=14.7, dipole efficiency=3.83). An ink preferably contains a solvent having a solubility parameter (SP) value ((cal/cm)$^{1/2}$) of 9.5 to 15.0 and a dipole efficiency of 2.0 to 5.0 in an amount of 3% by weight or more with respect to the total amount of solvents from a viewpoint of fixability of a print image. The present embodiment has a characteristic that durability is not deteriorated against such an ink.

The SP value (solubility parameter of organic solvent) is a value represented by a square root of molecular aggregation energy and is calculated by a Bicerano method. The "Bicerano method" is described in Prediction of Polymer Properties (Plastics Engineering, 65) written by Jozef Bicerano. The unit of the SP value is (MPa)$^{1/2}$ and the SP value refers to a value at 25° C. Examples of the organic solvent having an SP value defined in the present embodiment are also described in "Polymer Handbook", third edition (John Wily & Sons), co-edited by J. Brandup, and E. H. Immergu, 1989, VH/pp. 526 to 539. The dipole efficiency is calculated by AM1 of MOPAC.

Examples of the organic solvent having an SP value of 16.0 (MPa)$^{1/2}$ or more and 21.0 (M Pa)$^{1/2}$ or less will be described below, but the organic solvent is not limited to these exemplary compounds. Note that a numerical value in parentheses represents an SP value ((MPa)$^{1/2}$).

Amyl acetate (16.0), ethylene glycol diethyl ether (17.0), ethyl propionate (17.2), diethylene glycol monoethyl ether acetate (17.4), methyl-2-pentanediol monoethyl ether (17.4), ethylene glycol dimethyl ether (17.6), diethylene glycol monolaurate (17.8), ethylene glycol monoethyl ether acetate (17.8), tripropylene glycol methyl ether (17.8), butyl propionate (18.0), ethyl acetate (18.6), ethylene glycol methyl ethyl acetate (18.8), tripropylene glycol (18.8), dipropylene glycol monomethyl ether (19.0), ethyl-2-hexanediol-1,3 (octylene glycol) (19.2), butyl lactate (19.2), diethylene glycol monobutyl ether (19.4), ethylene glycol monobutyl ether (19.4), cyclohexanone (20.3), ethyl lactate (20.5), anisole (19.4), and the like.

(Coloring Material)

For the ink in the present embodiment, for example, coloring materials for forming yellow, magenta, cyan, black, blue, green, and red inks are preferably used.

(Other Ink Additives)

The ink in the present embodiment can contain various additives in addition to the organic solvent.

EXAMPLES

Hereinafter, the present invention will be specifically described with reference to Examples, but the present invention is not limited thereto.

Example 1-1

[Preparation of Microcapsule Type Curing Agent]

100 parts by mass of a bisphenol F type epoxy resin and 100 parts by mass of 2-methylimidazole were reacted with each other in 200 parts by mass of a 1/1 mixed solvent of methanol and toluene at 80° C. for three hours, and then the solvent was distilled off under reduced pressure at 180° C. to obtain a solid compound.

100 parts by mass of the obtained compound was melted. 1 part by mass of 2-methylimidazole was mixed therewith, and the resulting mixture was cooled to room temperature and then pulverized to obtain a solid curing agent having an average particle size of 2 μm.

100 parts by mass of the obtained solid curing agent, 2 parts by mass of water, and 5 parts by mass of diphenylmethane diisocyanate (MDI) were added to 200 parts by mass of a bisphenol F type epoxy resin, and the resulting mixture was stirred at normal temperature for three hours. Thereafter, a reaction was caused at 45° C. for 24 hours to obtain a microcapsule type curing agent.

[Preparation of Adhesive]

The following compositions were mixed to prepare an adhesive.

Main Agent:

jER 807 (bisphenol F type epoxy resin; manufactured by Japan Epoxy Resin Co., Ltd.): 75 parts by mass jER 152 (novolac type epoxy resin; manufactured by Japan Epoxy Resin Co., Ltd.): 25 parts by mass Curing Agent:

Microcapsules (microcapsule type thermal anionic polymerization initiator): 50 parts by mass Alcohol:

Benzyl alcohol (boiling point: 205° C.) as high-boiling-point alcohol (1): 3 parts by mass

[Preparation of Inkjet Head]

The head chip 1 and the wiring substrate 3, which are constituent members of the inkjet head illustrated in FIG. 1, were joined to each other using the above adhesive, and the head chip 1 and the nozzle plate 2, which are constituent members of the inkjet head illustrated in FIG. 1, were joined to each other using the above adhesive. The adhesive was cured at a curing temperature of 60° C. to perform bonding, thus preparing an inkjet head.

[Preparation of Pellets]

The above adhesive was cured at a curing temperature of 60° C. to prepare pellets.

Example 1-2

An inkjet head and pellets were prepared in a similar manner to Example 1-1 except that the curing temperature of the adhesive was 80° C.

Example 1-3

An inkjet head and pellets were prepared in a similar manner to Example 1-1 except that the curing temperature of the adhesive was 100° C.

Example 2

An inkjet head and pellets were prepared in a similar manner to Example 1-2 except that hexanol (boiling point: 157° C.), which is a high-boiling-point alcohol (2), was used as the alcohol.

Example 3

An inkjet head and pellets were prepared in a similar manner to Example 1-2 except that pentanol (boiling point: 137° C.), which is a low-boiling-point alcohol (1), was used as the alcohol.

Example 4

An inkjet head and pellets were prepared in a similar manner to Example 1-2 except that isopropanol (boiling point: 82.4° C.), which is a low-boiling-point alcohol (2), was used as the alcohol.

Comparative Example 1-1

An inkjet head and pellets were prepared in a similar manner to Example 1-1 except that no alcohol was added.

Comparative Example 1-2

An inkjet head and pellets were prepared in a similar manner to Example 1-2 except that no alcohol was added.

Comparative Example 1-3

An inkjet head and pellets were prepared in a similar manner to Example 1-3 except that no alcohol was added.

Comparative Example 2-1

An inkjet head and pellets were prepared in a similar manner to Example 1-1 except that the curing agent was not microencapsulated.

Comparative Example 2-2

An inkjet head and pellets were prepared in a similar manner to Example 1-2 except that the curing agent was not microencapsulated.

Comparative Example 2-3

An inkjet head and pellets were prepared in a similar manner to Example 1-3 except that the curing agent was not microencapsulated.

Comparative Example 3-1

An inkjet head and pellets were prepared in a similar manner to Example 1-1 except that no alcohol was added and the curing agent was not microencapsulated.

Comparative Example 3-2

An inkjet head and pellets were prepared in a similar manner to Example 1-2 except that no alcohol was added and the curing agent was not microencapsulated.

Comparative Example 3-3

An inkjet head and pellets were prepared in a similar manner to Example 1-3 except that no alcohol was added and the curing agent was not microencapsulated.

The following organic solvent durability (curability) test was performed on the above pellets prepared from the adhesives. The following heat cycle (reliability) test was performed on the inkjet heads prepared using the adhesives as described above. Furthermore, the following throughput (thickening rate) measurement was performed on the pellets prepared from the adhesives.

(1) Organic Solvent Durability (Curability) Test

Pellets of each adhesive were immersed in an ink solvent made of N-methylpyrrolidone (NMP), and a swelling ratio was measured. Evaluation criteria are as follows.

⊙ (Best): Swelling ratio was 2% or less

○ (Good): Swelling ratio was 4% or less

Δ (Acceptable): Swelling ratio exceeded 4%

Not cured: Epoxy resin was not cured

Evaluation results are presented in Table 1.

(2) Heat Cycle (Reliability) Test

A heat cycle test was performed on each inkjet head with [−20° C., three hours]→[80° C., three hours] as one cycle. Evaluation criteria are as follows. Note that in Examples 1-1, 1-2, 1-3, 2, 3, and 4, it was confirmed with an electron microscope that a residue of microcapsules was present and diffused in a cured epoxy resin.

⊙ (Best): No abnormality occurred after 60 cycles

○ (Good): No abnormality occurred after 40 cycles, but abnormality occurred after 60 cycles.

Δ (Acceptable): No abnormality occurred after 20 cycles, but abnormality occurred after 40 cycles.

× (Not acceptable): Abnormality occurred after 20 cycles

Evaluation results are presented in Table 1.

(3) Throughput (Thickening Rate) Measurement

A time until the viscosity of the pellets of each adhesive doubled was measured. Evaluation criteria are as follows.

⊙ (Good): 24 hours or more

× (Not acceptable): less than 24 hours

Evaluation results are presented in Table 1.

TABLE 1

| | Constituent element | | | Alcohol | | Organic solvent durability | Heal cycle | Throughput (thickening |
|---|---|---|---|---|---|---|---|---|
| | Main agent | Curing agent | (Capsule-dissolving solvent) | boiling point | Curing temperature | (curability) test | (reliability) test | rate) measurement |
| Example 1-1 | Bisphenol F type epoxy | Microencapsulated imidazole | High-boiling-point alcohol (1) Benzyl alcohol | 205° C. | 60° C. | ○ | ⊙ | ○ |
| Example 1-2 | | | High-boiling-point alcohol (1) Benzyl alcohol | 205° C. | 80° C. | ⊙ | ⊙ | ○ |
| Example 1-3 | | | High-boiling-point alcohol (1) Benzyl alcohol | 205° C. | 100° C. | ⊙ | Δ | ○ |
| Example 2 | | | High-boiling-point alcohol (2) Hexanol | 157° C. | 80° C. | ○ | ○ | ○ |
| Example 3 | | | Low-boiling-point alcohol (1) Pentanol | 137° C. | 80° C. | ○ | Δ | ○ |
| Example 4 | | | Low-boiling-point alcohol (2) Isopropanol | 82.4° C. | 80° C. | ○ | Δ | ○ |
| Comparative Example 1-1 | | | — | — | 60° C. | Not cured | Not cured | — |
| Comparative Example 1-2 | | | — | — | 80° C. | Δ | X | ○ |
| Comparative Example 1-3 | | | — | — | 100° C. | ⊙ | X | ○ |
| Comparative Example 2-1 | | Imidazole | High-boiling-point alcohol Benzyl alcohol | 205° C. | 60° C. | ○ | X | X |
| Comparative Example 2-2 | | | High-boiling-point alcohol Benzyl alcohol | 205° C. | 80° C. | ⊙ | X | X |
| Comparative Example 2-3 | | | High-boiling-point alcohol Benzyl alcohol | 205° C. | 100° C. | ⊙ | X | X |
| Comparative Example 3-1 | | | — | — | 60° C. | ○ | X | X |
| Comparative Example 3-2 | | | — | — | 80° C. | ⊙ | X | X |
| Comparative Example 3-3 | | | — | — | 100° C. | ⊙ | X | X |

[Evaluation]
(1) Organic Solvent Durability (Curability) Test
By containing an epoxy resin and an imidazole-based curing agent which is a chain polymerization type curing agent, all the adhesives of Examples and Comparative Examples have been confirmed to have "Δ (acceptable)" to "⊙ (best)" in organic solvent durability when the curing temperature is 80° C. or higher. High durability against an ink containing an organic solvent is a preferable characteristic as an inkjet head.

The adhesive of Example 1-1 contains the microencapsulated curing agent and the alcohol that dissolves the microcapsules at a low temperature. Therefore, the adhesive of Example 1-1 can be sufficiently cured even at a low temperature of 60° C. as compared with the adhesive of Comparative Example 1-1, thermal stress does not increase in the inkjet head during assembly, and the constituent members are not damaged by a high temperature. Therefore, long-term reliability can be secured.

(2) Heat Cycle (Reliability) Test
Examples 1-1, 1-2, 1-3, 2, 3, and 4 had "Δ (acceptable)" to "⊙ (best)".
The adhesives of Examples 1-1, 1-2, 1-3, 2, 3, and 4 each contain the microencapsulated curing agent and the alcohol that dissolves the microcapsules at a low temperature. Therefore, it has been confirmed that the adhesives of Examples 1-1, 1-2, 1-3, 2, 3, and 4 can be cured at a low temperature of 100° C. or lower, even when members made of many types of materials are joined to each other, the members are not deformed after the adhesives are cured due to a difference in linear expansion coefficient between the members, heat cycle resistance is high, and peeling does not occur in a joint.

In addition, since the residue of the microcapsules is uniformly dispersed as a soft segment in the epoxy resin, it has been confirmed that toughness is imparted to the entire epoxy resin and the long-term reliability of the inkjet head is significantly improved.

Furthermore, comparing Examples 1-1, 1-2, 1-3, and 2 with Examples 3 and 4, it has been confirmed that a high-boiling-point alcohol is preferable as the alcohol, and a difference between the boiling point of the alcohol and the curing temperature is preferably 120° C. or more. This is considered to be because by interposing the high-boiling-point alcohol in the polymer structure of the epoxy resin, the cured epoxy resin is softened, stress of a bonding portion between the members is relaxed, and heat cycle resistance (reliability) and stability of ink ejection are improved.

(3) Throughput (Thickening Rate) Measurement
The adhesive of Example 1-1 contains the microencapsulated curing agent and the alcohol that dissolves the microcapsules at a low temperature. Therefore, unlike Comparative Examples 1-1, 2-1, and 3-1, it has been confirmed that the adhesive of Example 1-1 can be sufficiently cured even at a low temperature of 60° C., and the viscosity increase rate of the epoxy resin is reduced to secure a time for joining work before the epoxy resin is cured. It is a preferable characteristic as an inkjet head constituted by positioning and bonding a large number of members to spend a time in joining work before the epoxy resin is cured.

REFERENCE SIGNS LIST

1 Head chip
11 Channel member

12 Pressure chamber
13 Metal layer
14 Connection electrode
2 Nozzle plate
21 Nozzle
3 Wiring substrate
32 Opening
33 Wiring electrode
36a Dummy electrode

The invention claimed is:

1. An inkjet head comprising constituent members bonded to each other by an adhesive containing at least an epoxy resin as a main agent, a microencapsulated imidazole-based curing agent as a curing agent, and an alcohol that dissolves the microcapsules at a low temperature, wherein the alcohol has a benzene ring.

2. The inkjet head according to claim 1, wherein a residue of the microcapsules dissolved by the alcohol is dispersed in the cured epoxy resin.

3. The inkjet head according to claim 2, wherein the alcohol is a high-boiling-point alcohol.

4. The inkjet head according to claim 1, wherein the alcohol is a high-boiling-point alcohol.

5. The inkjet head according to claim 4, wherein the high-boiling-point alcohol has a boiling point of 150° C. or higher.

6. A production method for an inkjet head, the method comprising bonding constituent members to each other using an adhesive containing at least an epoxy resin as a main agent, a microencapsulated imidazole-based curing agent as a curing agent, and an alcohol that dissolves the microcapsules at a low temperature, wherein the alcohol has a benzene ring.

7. The production method for an inkjet head according to claim 6, wherein a residue of the microcapsules dissolved by the alcohol is dispersed in the epoxy resin to cure the epoxy resin.

8. The production method for an inkjet head according to claim 7, wherein a high-boiling-point alcohol is used as the alcohol.

9. The production method for an inkjet head according to claim 6, wherein a high-boiling-point alcohol is used as the alcohol.

10. The production method for an inkjet head according to claim 9, wherein the high-boiling-point alcohol has a boiling point of 150° C. or higher.

* * * * *